United States Patent [19]
Hearn et al.

[11] Patent Number: 5,785,529
[45] Date of Patent: Jul. 28, 1998

[54] CONNECTOR FOR MODELING KITS

[76] Inventors: S. A. Hearn; Hume A. Feldman, both of 1209 Tennessee St., Lawrence, Kans. 66044

[21] Appl. No.: 890,131

[22] Filed: Jul. 9, 1997

[51] Int. Cl.⁶ .......................... G09B 23/26; G09B 23/04; A63H 33/06

[52] U.S. Cl. ........................ 434/211; 273/DIG. 2; 446/126

[58] Field of Search ................ 434/211; 446/126, 446/486; 273/DIG. 2, DIG. 3

[56] References Cited

U.S. PATENT DOCUMENTS

| | | | |
|---|---|---|---|
| Re. 33,785 | 12/1991 | Hildebrandt et al. | |
| 2,722,772 | 11/1955 | Steanes | 446/126 |
| 2,783,046 | 2/1957 | Lien | 446/126 |
| 3,147,976 | 9/1964 | Gruss et al. | 273/DIG. 2 |
| 3,286,391 | 11/1966 | Mengerinnhausen | 446/126 |
| 3,552,039 | 1/1971 | Fukuoka | 273/DIG. 2 |
| 3,643,941 | 2/1972 | Kashar | 273/DIG. 2 |
| 3,998,003 | 12/1976 | Rosenbaum | 434/211 |
| 4,281,836 | 8/1981 | Black | 273/DIG. 2 |
| 4,302,900 | 12/1981 | Rayner | 446/126 |
| 4,325,552 | 4/1982 | Glasheen | 434/211 |
| 4,608,027 | 8/1986 | Klamer et al. | 446/486 |
| 5,340,349 | 8/1994 | Berg-Fernstrum | 446/126 |
| 5,433,647 | 7/1995 | Ciquet | 446/486 |

*Primary Examiner*—Paul J. Hirsch
*Attorney, Agent, or Firm*—Hovey,Williams, Timmons & Collins

[57] ABSTRACT

A connector body (10) for joining elongated rods or struts (12) for use in creating three-dimensional structures or models is disclosed. The connector body (10) includes a plurality of resilient particles (14) such as spherical balls formed of polystyrene material and a cohering means (16) such as an adhesive compound for cohering the particles (14) to form the connector body. The connector body (10) is highly resilient and crush-resistant and can be easily penetrated by the ends of the elongated rods (12) to form three-dimensional structures. Once the rods (12) are removed from the connector body (10), the connector body immediately returns to its original shape to close the openings formed by the ends of the rods (12).

12 Claims, 1 Drawing Sheet

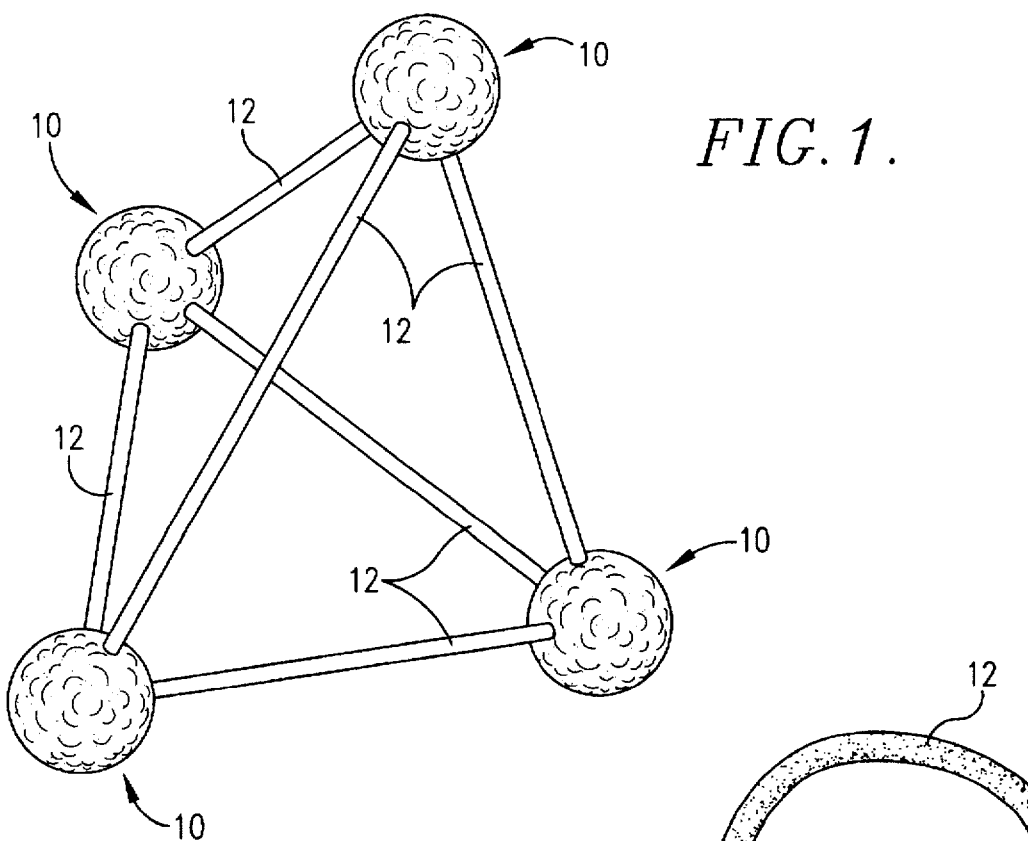
FIG. 1.
FIG. 2.
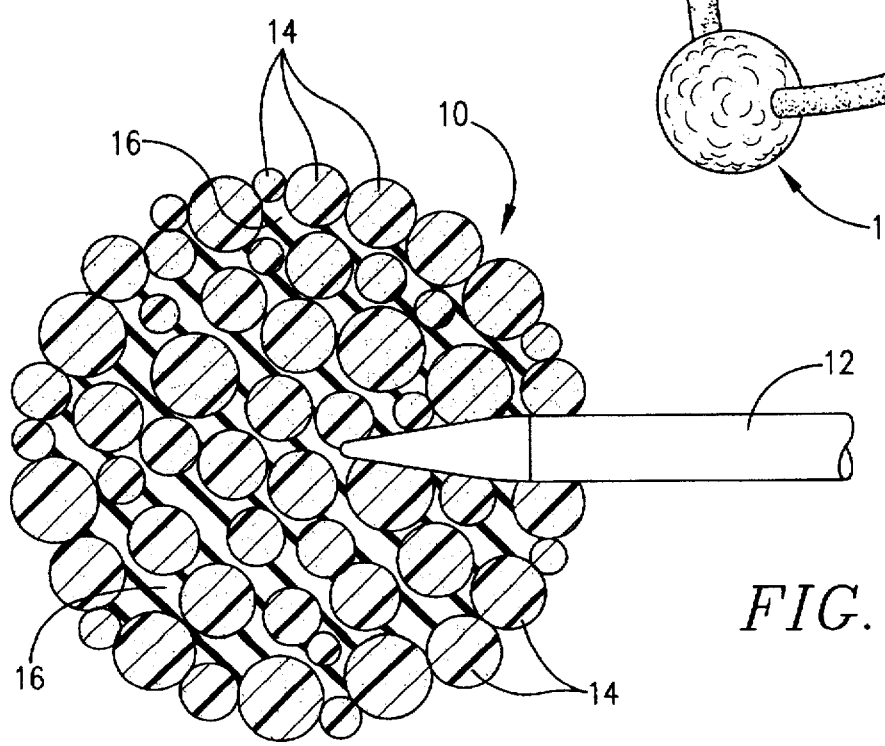
FIG. 3.

CONNECTOR FOR MODELING KITS

BACKGROUND OF THE INVENTION

1. Field of the Invention

The present invention relates to connectors used in three-dimensional modeling kits for constructing three-dimensional geometrical structures and models. More particularly, the invention relates to such a connector that is highly resilient, easily penetratable, and crush-resistant.

2. Description of the Prior Art

Three-dimensional modeling kits are commonly used by children and adults for constructing simple or complicated three-dimensional structures and models. Typical prior art modeling kits include a plurality of connectors or nodes each having pre-formed openings therein and a plurality of elongated, rigid struts or rods, the ends of which are inserted in selected openings in the connectors to form desired three-dimensional structures or models. A prior art modeling kit of this type is described in U.S. Pat. No. RE.33,785.

Unfortunately, these types of prior art modeling kits can only be used to create a limited number of three-dimensional shapes because the openings in the connectors are pre-formed and fixed in location. Thus, the rods can only be inserted in the connectors in a finite number of different positions to create a finite number of structures or models. Moreover, the connectors in these types of modeling kits are hazardous for small children because they are typically formed of hardened plastic and are of a size that can be easily swallowed.

Marshmallows, peas, and other soft objects have been used as connectors in modeling kits to solve the above-described problems. Rods such as toothpicks can be inserted at any position within these objects, thus permitting the formation of nearly any three-dimensional structure. However, the marshmallows or peas quickly rot or spoil and therefore cannot be stored and used for long periods of time. Moreover, the marshmallows or peas quickly fall apart and disintegrate when rods are repeatedly inserted and removed.

OBJECTS AND SUMMARY OF THE INVENTION

In view of the foregoing, it is an object of the present invention to provide an improved modeling kit for creating three-dimensional structures and models.

It is a more particular object of the present invention to provide an improved connector for use in three-dimensional modeling kits and other applications requiring the joining of two or more objects.

It is another object of the present invention to provide a connector that can be penetrated by the ends of a rod or strut at an infinite number of positions.

It is another object of the present invention to provide such a connector that is shelf-stable and inert.

It is another object of the present invention to provide such a connector that is highly resilient and crush-resistant and therefore capable of being used repeatedly without disintegrating.

The present invention achieves these objects and other objects that become evident from the description of the preferred embodiments of the invention herein by providing an improved connector for use in three-dimensional modeling kits. The connector of the present invention broadly includes a plurality of resilient particles such as spherical balls formed of polystyrene material and a cohering means such as an adhesive compound for cohering the particles to form the connector. A plurality of connectors are preferably formed by mixing the resilient particles with the cohering means in approximately equal volumes and then forming the mixture into the connectors by any conventional manner such as extrusion processes.

Once formed and dried, the connectors are highly resilient, easily penetratable, and crush-resistant. Thus, rods or struts having pointed ends can be easily inserted into the connectors at any location to form an infinite number of three-dimensional structures or models, making the connectors ideal for use in modeling kits. The connectors firmly hold the rods, but when the rods or struts are removed from the connectors, the connectors immediately return to their original shape to close the openings formed by the ends the of rods. Thus, the connectors of the present invention can be repeatedly reused for long periods of time.

BRIEF DESCRIPTION OF THE DRAWING FIGURES

A preferred embodiment of the present invention is described in detail below with reference to the attached drawing figures, wherein:

FIG. 1 is an elevational view of a plurality of connectors constructed in accordance with a preferred embodiment of the present invention shown joining a plurality of rigid rods or struts to form a three-dimensional structure or model;

FIG. 2 is an elevational view of one of the connectors of the present invention shown coupled with an elongated flexible wire to form another three-dimensional structure; and FIG. 3 is a sectional view of one of the connectors showing the end of a rod or strut inserted therein.

DETAILED DESCRIPTION OF THE PREFERRED EMBODIMENTS

The drawing figures illustrate a plurality of connectors 10 constructed in accordance with a preferred embodiment of the invention. The connectors 10 are preferably used in a modeling kit to join a plurality of rods or struts 12 for forming three-dimensional structures or models as illustrated in FIGS. 1 and 2. The rods or struts may be any type of elongated objects having pointed ends such as plastic or wood toothpicks or flexible rubber coated wires or pipe cleaners.

In more detail, each connector 10 includes a plurality of resilient particles 14 and a cohering means 16 for cohering the particles together. The resilient particles are preferably spherical balls formed of expanded synthetic resin foam material such as styrene, polystyrene, styrofoam or other equivalent material. The spherical balls preferably have diameters ranging from approximately 1/32 to 1/8 inch, and preferably approximately 1/16 inch. One type of particles that may be used to form the connectors is expandable polystyrene balls manufactured by the BASF Wyandotte Corporation of Jamesburg, N.J. Those skilled in the art will appreciate that the resilient particles 14 may also be formed of other material and in other shapes and sizes. Additionally, the resilient particles may be colored to improve the visual appeal of the connectors.

The cohering means 16 is preferably an adhesive compound such as rubber cement or silicone rubber made from silicone elastomers. One type of adhesive compound that may be used is a silicone rubber sealant manufactured by the General Electric Company of Waterford, N.Y. under the trade name Silicone II. Those skilled in the art will appreciate that cohering means formed of other equivalent materials may also be used.

The connectors 10 are formed by first mixing the resilient particles 14 with the cohering means 16 in any conventional manner. The mixture is preferably approximately 50–80% resilient particles by volume. Applicant has discovered that if a greater volume percentage of resilient particles is used, the resulting connectors would be too brittle and would easily disintegrate when rods are repeatedly inserted therein and removed therefrom, and if a lesser volume percentage of resilient particles is used, the resulting connectors would be too heavy and dense and would be difficult to color.

The mixture of resilient particles and cohering means is then formed into a plurality of the connectors of any desired shape or size by any conventional manner. For example, the mixture may be extruded and then cut into the individual connectors or manually formed into the connectors. The mixture is preferably formed into spherical balls having diameters in the range of approximately ¼ to 1 inch, and preferably approximately ½ inch.

Once formed and dried, the connectors 10 are highly resilient, easily penetratable, and crush-resistant. Thus, the ends of the rods or struts 12 can be easily inserted into the connectors at any location to form an infinite number of three-dimensional structures or models, making the connectors of the present invention ideal for use in modeling kits. The connectors firmly hold the rods, but when the rods or struts are removed from the connectors, the connectors immediately return to their original shape to close the openings formed by the ends the of rods. Thus, the connectors of the present invention can be repeatedly reused for long periods of time.

Although the invention has been described with reference to the preferred embodiment illustrated in the attached drawing figures, it is noted that equivalents may be employed and substitutions made herein without departing from the scope of the invention as recited in the claims. For example, the material formed by the resilient particles 14 and cohering means 16 is not limited to use with modeling kits but may also be used as a building material, insulation, packing material for packaging, or shock shield for sensitive electronic equipment or other fragile items.

Having thus described the preferred embodiment of the invention, what is claimed as new and desired to be protected by Letters Patent includes the following:

1. A connector for connecting elongated objects having pointed ends comprising:

a plurality of resilient particles; and cohering means for cohering said particles to form a crush-resistant body having a substantially aperture-free outer surface that is highly resilient and easily penetratable by the pointed ends of the objects and that substantially regains its aperture-free configuration when the pointed ends of the objects are removed therefrom.

2. The connector as set forth in claim 1, said cohering means including an adhesive compound.

3. The connector as set forth in claim 2, wherein said adhesive compound is selected from the group consisting of rubber cement and silicone rubber.

4. The connector as set forth in claim 1, wherein said resilient particles are formed from expanded synthetic resin foam material.

5. The connector as set forth in claim 2, wherein said resilient particles and said adhesive compound are mixed in approximately equal volume amounts to form said body.

6. A construction kit for constructing three-dimensional structures and models comprising:

a plurality of rods each having pointed ends; and a plurality of connectors for connecting the rods to form the three-dimensional structures and models, each of said connectors comprising a plurality of resilient particles, and cohering means for cohering said particles to form a crush-resistant body having a substantially aperture-free outer surface that is highly resilient and easily penetratable by the pointed ends of the rods and that substantially regains its aperture-free configuration when the pointed ends of the rods are removed therefrom.

7. The construction kit as set forth in claim 6, said cohering means including an adhesive compound selected from the group consisting of rubber cement and silicone rubber.

8. The construction kit as set forth in claim 6, wherein said resilient particles are formed from expanded synthetic resin foam material selected from the group consisting of styrene, polystyrene, and styrofoam.

9. The construction kit as set forth in claim 7, wherein said resilient particles and said adhesive compound are mixed in equal volume amounts to form said connector bodies.

10. A method of making connectors for connecting objects having pointed ends comprising the steps:

mixing a plurality of resilient particles with an adhesive compound to form a mixture;

forming said mixture into a plurality of individual bodies; and drying said bodies, the bodies being crush-resistant and having a substantially aperture-free outer surface that is highly resilient and easily penetratable by the pointed ends of the objects and that substantially regains its aperture-free configuration when the pointed ends of the objects are removed therefrom.

11. The method as set forth in claim 10, wherein said adhesive compound is selected from the group consisting of rubber cement and silicone rubber.

12. The method as set forth in claim 10, wherein said resilient particles are formed of synthetic resin foam material selected from the group consisting of styrene, polystyrene, and styrofoam.

* * * * *